United States Patent [19]

Grinnell, Jr.

[11] 3,845,371

[45] Oct. 29, 1974

[54] MOTOR CONTROLLER WITH POWER LIMITING

[75] Inventor: Peter S. Grinnell, Jr., Framingham, Mass.

[73] Assignee: International Equipment Company, Needham Heights, Mass.

[22] Filed: Apr. 6, 1973

[21] Appl. No.: 348,680

[52] U.S. Cl. .............................. 318/391, 318/398
[51] Int. Cl. ............................................ H02p 5/16
[58] Field of Search .......... 318/391, 392, 397, 398, 318/416, 430, 431, 434

[56] References Cited
UNITED STATES PATENTS
3,743,907 7/1973 Dosch ............................... 318/391

Primary Examiner—Robert K. Schaefer
Assistant Examiner—Thomas Langer
Attorney, Agent, or Firm—Kenway & Jenny

[57] ABSTRACT

A drive system for a DC motor, having phase control in a first feedback loop providing proportional control of motor speed, develops a reference feedback signal responsive to a dynamic maximum input power allowable for the motor. A second feedback loop compares this power-responsive feedback signal with a speed-responsive feedback signal to limit the first control loop as to (i) motor starting voltage, (ii) motor acceleration, and (iii) maximum motor input voltage. The resultant control of the motor enables it to drive a load, including the motor shaft, of low torsional strength without danger of exceeding even fragile torsional limits.

18 Claims, 10 Drawing Figures

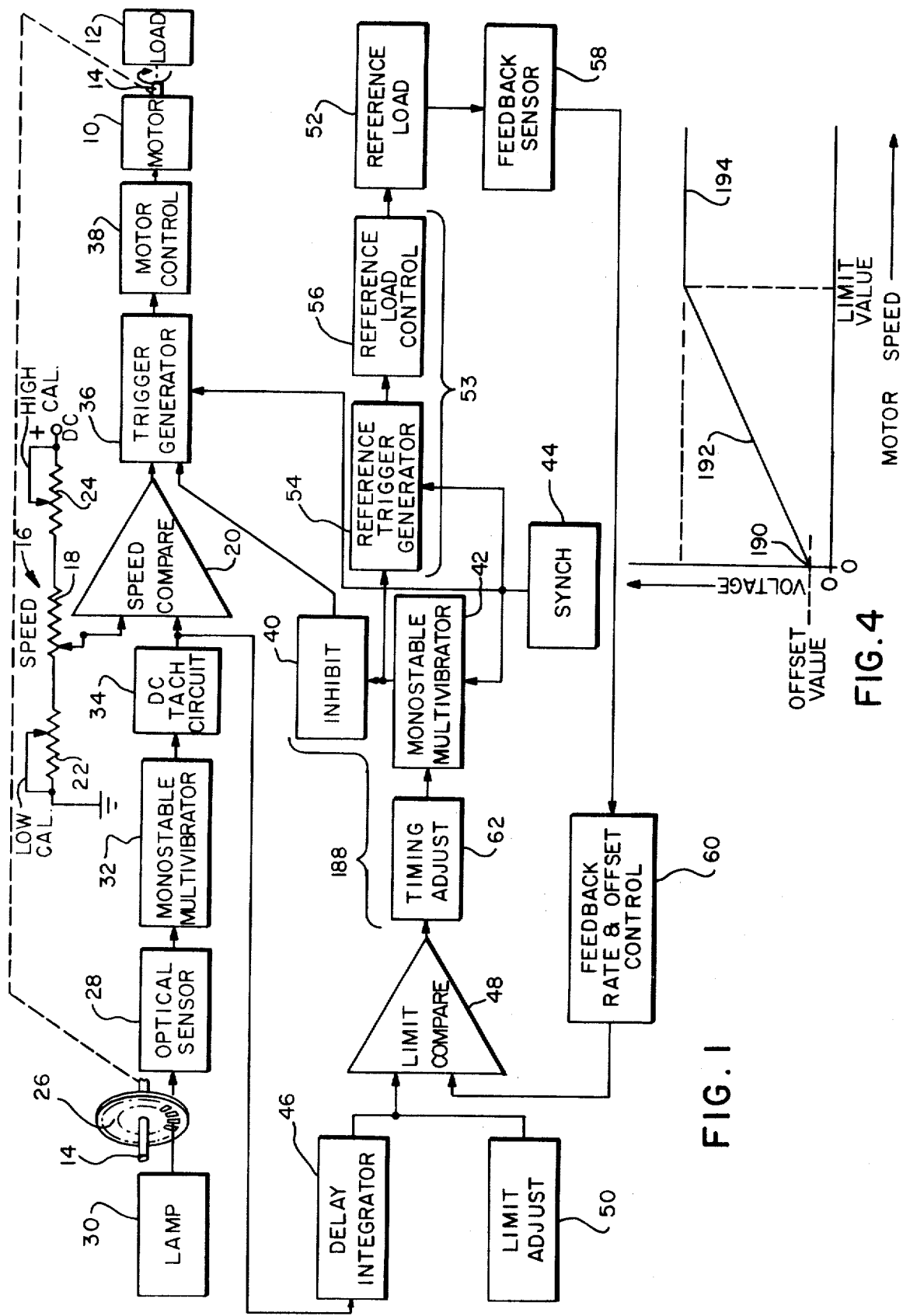

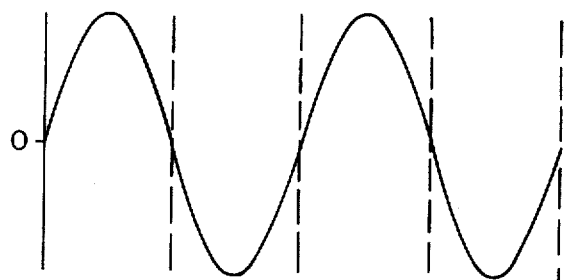
FIG. 2A
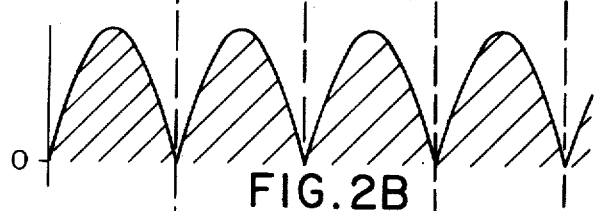
FIG. 2B
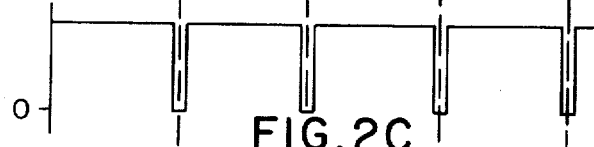
FIG. 2C
FIG. 2D
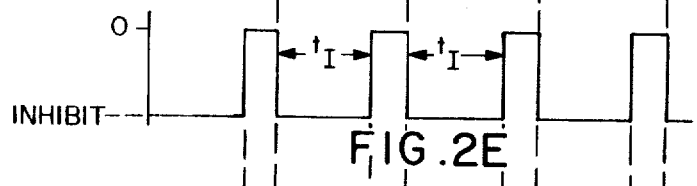
FIG. 2E
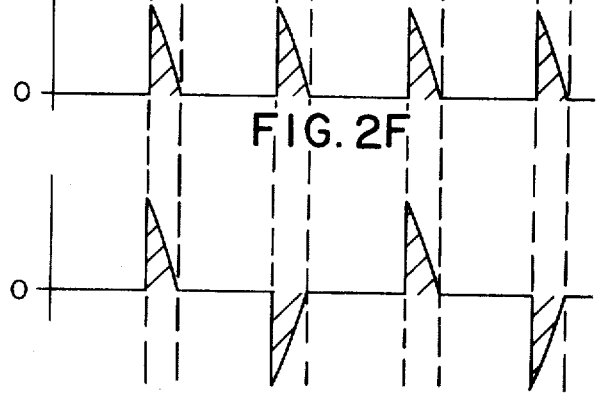
FIG. 2F
FIG. 2G

MOTOR CONTROLLER WITH POWER LIMITING

BACKGROUND OF THE INVENTION

This invention relates to speed-responsive phase control of electric motors for the purpose of limiting the torque which the motor applies to its load. To this end, the invention provides control equipment for limiting the voltage, and correspondingly the power, applied to a motor in accordance with the motor speed. The control equipment limits the motor operation in a unique manner that precludes even momentary overtorque operation.

The invention is useful in a centrifuge, for example, when it is desired that the shaft which couples the drive motor to the centrifuge head have significant longitudinal flexibility, which generally results in low torque strength.

In the prior art of motor drive apparatus, motor input power typically is monitored, directly or indirectly, from the motor itself to produce a feedback signal. The response of the drive apparatus to such a feedback signal lags several half cycles behind the motor excitation. The resultant delay can result in the motor driving its load, including the shaft, with excessive torque for a brief but potentially damaging time, insofar as the shaft and/or other load elements are concerned. Also, it is difficult to obtain an accurate measure, for feedback control purposes, of the electrical power being applied to a motor due to the complex reaction impedance of the motor. This is particularly true in motor drive systems employing phase control, e.g. employing control by gated rectifiers, because the resultant drive voltage applied to the motor has a complex and discontinuous waveform.

Accordingly, it is an object of this invention to provide phase-controlling motor drive apparatus which imposes a limit on the motor input voltage at all speeds, including start-up.

Another object of this invention is to provide phase-controlling motor drive apparatus which limits the motor acceleration.

It is also an object of the invention to provide apparatus for the proportional phase control of electric-motor speed and which limits the motor torque at all speeds, including during start-up, acceleration and overload conditions.

A further object of the invention is to provide motor control apparatus having the foregoing features without reference to the complex waveforms of motor current and/or voltage.

Another object of the invention is to provide motor control apparatus having the foregoing features with selective control on motor starting voltage, motor acceleration, and maximum motor input power.

Other objects of the invention will in part be obvious and will in part appear hereinafter.

SUMMARY OF THE INVENTION

Motor control apparatus embodying the invention typically has a proportionally controlling, first feedback loop that drives the motor to attain and maintain a selected speed. A second control loop imposes limits on the motor drive of the first control loop. These limits restrain the torque the motor applies to its load, including the motor output shaft. In particular, the second control circuit limits the starting voltage of the motor, the rate of motor acceleration, and the maximum available motor voltage. The latter limitation is effective, for example, when the motor is overloaded, and is such that the motor speed progressively decreases until either the motor stops or the overload condition abates.

The second control loop has two input signals, one of which is a speed-responsive signal used in the first control loop. The second input signal is responsive to the limited, i.e. maximum allowable, motor input power for the given motor speed. This latter signal is derived not from the motor itself, but from a reference load which is driven electrically with the motor. This use of a reference load, in lieu of the motor itself, provides a power-responsive feedback signal which automatically and accurately tracks the maximum allowable motor input power without the use of a complex function generator and without the problems attendant on monitoring drive currents and/or voltages of the motor itself.

The second control loop responds to a difference function between the two input signals to limit the firing angle with which the first control loop energizes the motor.

The result of providing the foregoing features in a proportional motor speed controller is that it limits the motor output torque. The limiting of motor torque is effective during start-up, acceleration, and overload conditions. Moreover, the equipment provides the torque limiting prior to any occurrences of excessive motor drive, and hence precludes even instantaneous bursts of excessive torque.

One specific example of the advantages which stem from the invention is that it can drive a centrifuge motor, which is directly coupled to the centrifuge head through a thin flexible drive shaft having a torsional strength of only six foot-pounds, to a maximum speed of at least six thousand rpm without over-torquing the shaft.

BRIEF DESCRIPTION OF DRAWINGS

For a fuller understanding of the nature and objects of the invention, reference should be made to the following detailed description and the accompanying drawings, in which:

FIG. 1 is a functional schematic representation of a motor drive system embodying the invention;

FIG. 2 shows waveforms illustrating operation of the system of FIG. 1;

FIG. 4 is a graph of maximum allowable motor operation which the invention provides.

DESCRIPTION OF ILLUSTRATED EMBODIMENT

Figure 3:
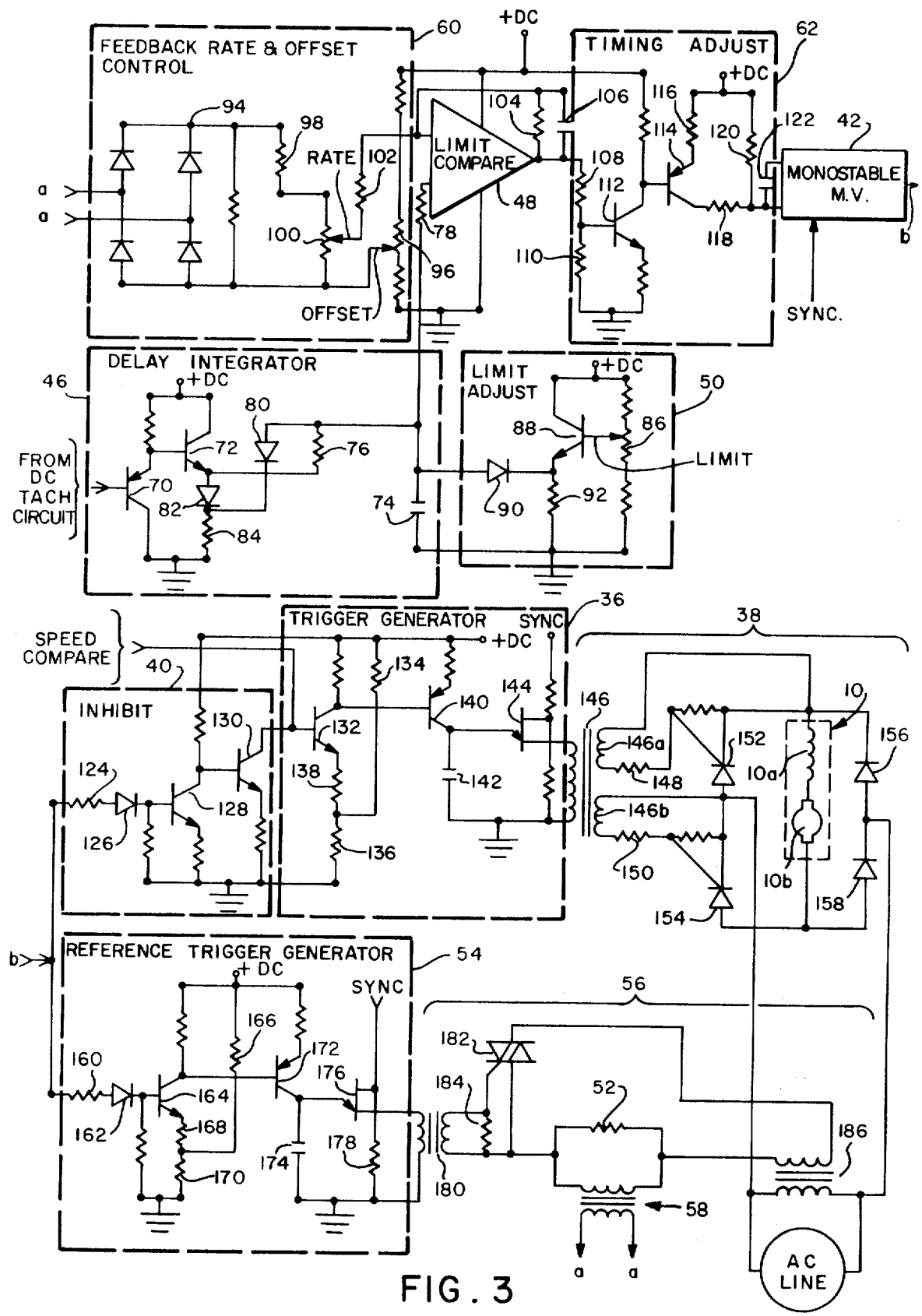
FIG. 3 is a schematic diagram of circuits for use in the system of FIG. 1.

With reference to FIG. 1, a drive system for a DC motor 10, typically a series universal motor illustrated as driving a load 12 connected to the motor shaft 14, has a manual speed selector 16 that adjusts a potentiometer 18 to apply a selected direct voltage to one input of a speed compare differential amplifier 20. The potentiometer 18 is connected between ground and a direct voltage supply through adjustable low speed and high speed calibrating resistors 22 and 24 respectively.

The other input to the differential amplifier 20 is a direct voltage proportional to motor speed. This signal is obtained by driving an apertured optical chopping disc 26 in accordance with the motor speed, typically by mounting the disc on the motor shaft 14 for drive therewith as indicated. An optical sensor 28 senses lamp 30 illumination which passes through apertures in the disc to produce electrical pulses at a rate corresponding to the disc speed and hence to the motor speed. Each pulse triggers a monostable multivibrator 32 to produce a pulse stream that is applied to a DC tachometer circuit 34. The tachometer circuit integrates the pulse stream to produce a direct voltage proportional to the actual motor speed.

The foregoing portion of the FIG. 1 system is by and large conventional and, as is further conventional in proportional phase control of motor speed, the speed compare differential amplifier 20 develops an output "speed error" signal according to the arithmetic difference between its two input signals. A trigger generator 36 responds to this direct voltage speed error signal to energize a motor control unit 38 at the proper phase in each half cycle of the AC line power to drive the motor 10 proportionally to attain and maintain the selected speed.

As FIG. 1 further shows, an inhibit circuit 40, which receives the pulse train from a monostable multivibrator 42, is connected to the trigger generator 36. A synchronizing unit 44 applies sync signals to the generator 36 and to the multivibrator 42 at twice the frequency of the AC line power, i.e. at each time the AC line voltage passes through zero.

The operation on the trigger generator 36 and hence on the motor 10 of these elements 40, 42 and 44, in conjunction with the control loop in which the multivibrator 42 is connected, can be summarized as follows with reference to FIGS. 1 and 2. FIG. 2A shows the AC line voltage as a function of time for two cycles, and FIG. 2B shows the same voltage after full wave rectification. FIG. 2C shows the synch voltage waveform, from synch unit 44, which corresponds to the line voltage of FIG. 2A.

In the absence of control by the inhibit circuit 40, the trigger generator 36 responds to the speed error signal from differential amplifier 20 to drive the motor control unit 38 to gate a portion of each half cycle of rectified AC line voltage (FIG. 2B) to the motor. Accordingly, the voltage applied to the motor might have the waveform shown in FIG. 2D.

However, the inhibit circuit 40 prevents the trigger generator from responding to the speed error signal for an "inhibit time" in each half cycle of AC power, and the multivibrator 42 in the second control loop determines the duration of the inhibit time. That is, the monostable multivibrator 42 produces an output voltage waveform of the type shown in FIG. 2E. The low value of this voltage causes the inhibit circuit to disable the trigger generator from responding to the speed error signal. Hence, the duration of the low voltage in each half cycle is the inhibit time, $t_i$. Accordingly, by way of illustrative example, where the speed error signal calls for the motor to receive the voltage waveform of FIG. 2D and the monostable multivibrator produces the voltage waveform of FIG. 2E, the trigger generator 36 is inhibited from responding to the speed error signal during each inhibit time $t_i$. Consequently, the drive voltage to the motor 10 is limited to the waveform of FIG. 2F, and the motor does not receive higher-power waveform of FIG. 2D.

The sync unit 44 synchronizes the switching of the monostable multivibrator 42 with the AC line voltage, and prevents the trigger generator 36 from producing trigger signals during the time when the line voltage value is zero.

To provide the foregoing operation, the second control loop adjusts the astable period of the multivibrator 42, and hence the inhibit time, in response to the actual motor speed and to the limiting value of the motor input voltage, and correspondingly power. The motor speed information is derived from the speed-responsive DC level output from the tachometer circuit 34. This level is applied to a delay integrator 46, the output signal of which is applied to one input of a limit compare differential amplifier 48. The delay integrator delays the application to the differential amplifier 48 of an increase in the actual motor speed, thereby limiting the rate of motor acceleration. There is relatively insignificant delay, however, for a decreasing speed signal, i.e. when the motor speed decreases.

With further reference to FIG. 1, a limit adjust unit 50 imposes an adjustable maximum amplitude on the delayed speed signal for the purpose of limiting the maximum motor speed information applied to the differential amplifier 48. This, in turn, limits the maximum motor drive voltage to the value available at the limiting speed, even though the motor actually has a greater speed.

The other input signal to the limit compare differential amplifier 48 is responsive to the maximum available motor input voltage. This is the maximum voltage which the monostable multivibrator 42 and inhibit unit 40 will allow the trigger generator 36 and the motor control unit 38 to apply to the motor 10.

The invention produces this maximum available motor voltage signal for the differential amplifier 48 through the use of a resistive, motor-simulating reference load 52. A reference drive unit 53, illustrated as having a reference trigger generator 54 and a reference control unit 56, gates AC line voltage to the reference load in response to the sync signal from unit 44 and to the same inhibit pulses which the multivibrator 42 applies to the inhibit circuit 40. Hence, the voltage, and correspondingly the power, which the reference load 52 receives corresponds in magnitude and in phase, and is in synchronism with, the limit of voltage which the multivibrator 42 and inhibit unit 40 allow the motor 10 to receive.

By way of example, FIG. 2G shows the voltage waveforms which the reference load receives when the multivibrator 42 produces the output waveform of FIG. 2E.

A feedback sensor 58 coupled with the reference load 52 develops an AC signal directly responsive to the voltage which the reference load receives. A feedback rate and offset control unit 60 rectifies this AC feedback signal and applies a selected portion of it, together with an adjustable offset, to the second input of the limit compare differential amplifier 48.

In response to the arithmetic difference between the direct current voltage levels which it receives, one responsive to actual motor speed and the other responsive to maximum available motor voltage, the differential amplifier 48 produces a "limit error" signal which is applied to a timing adjust unit 62. The unit 62 adjusts the duration of the astable period of the multivibrator 42 according to the magnitude of the limit error signal.

As discussed above, this in turn adjusts the inhibit time imposed on the trigger generator 36 for limiting the motor input voltage and the output torque.

FIG. 3 illustrates a preferred construction for the elements in the second control loop, together with their connections with typical elements of the first control loop, of the motor control system of FIG. 1.

As FIG. 3 shows, the delay integrator 46 has transistors 70 and 72 in a dual emitter-follower arrangement that receives, at the base of transistor 70, the DC speed-responsive signal output from the FIG. 1 tachometer circuit 34. In response to this signal, the transistor pair develops current for charging a capacitor 74 through a resistor 76 connected between the capacitor and emitter of transistor 72. The resultant voltage across capacitor 74 is the delayed motor speed voltage, and is applied through an impedance-matching resistor 78 to one input of the limit compare differential amplifier 48.

Also in the delay integrator 46, a diode 80 discharges the capacitor 74 upon cessation of motor speed increase, for the purpose of providing a relatively insignificant time-delay for the speed-responsive signal input to the amplifier 48 whenever the motor speed is decreasing. A further diode 82 drops the voltage to which the diode 80 discharges capacitor 74 by the same amount as the forward drop in the latter diode. Hence capacitor 74 is discharged to the value of the voltage at the emitter of transistor 72.

The delay integrator 46 is thus constructed to apply the DC tachometer circuit output voltage to one input of the limit compare amplifier 48 with a time delay when that voltage, and correspondingly the motor speed, are rising; but with essentially no delay otherwise. The resultant delay causes the system of FIG. 1 to limit the maximum available motor voltage, during motor acceleration, to a value corresponding to the motor speed a brief instant earlier.

The limit adjust unit 50 has an adjustable voltage-dividing limit potentiometer 86 connected between a DC supply voltage and ground. The potentiometer tap is connected to the base of an emitter-follower transistor 88. Accordingly, adjustment of the limit-controlling potentiometer tap adjusts the conduction of transistor 86, which in turn adjusts the emitter voltage which the transistor develops across resistor 92. A diode 90 clamps the maximum value of the voltage across capacitor 74 to this emitter voltage, thereby to apply an adjustable limit on the speed-responsive voltage input to differential amplifier 48.

The feedback rate and offset control unit 60 (shown at the upper left in FIG. 3) receives the reference feedback voltage from the FIG. 1 feedback sensor 58 at terminals a—a, and applies it across a full-wave bridge rectifier 94. One output terminal of the rectifier is connected to the tap of an offset potentiometer 96, which in turn is connected across a DC supply voltage, to superpose an adjustable direct offset voltage onto the rectified reference feedback voltage from bridge 94.

Also in the feedback control unit 60, a resistor 98 is in series with a rate potentiometer 100 across the bridge 94 output terminals to form an adjustable voltage divider that allows a selected portion of the rectified reference feedback voltage to be applied, from the potentiometer 100 tap, to the other input terminal of differential amplifier 48. An input resistor 102 matched with resistor 78 is in series with the amplifier input terminal.

The feedback circuit of the differential amplifier 48 includes the parallel combination of a resistor 104 and a capacitor 106. The resistor 104 controls the amplifier gain, and the capacitor is effective to integrate ripple voltage present in the essentially unfiltered voltage output from the bridge 94. It should be noted, however, that the output voltage from the differential amplifier 48 is not required to be free of all such ripple, for it has been found that operation of the timing adjust unit 62 and of the multivibrator 42 (FIG. 1) is satisfactory and reliable when the amplifier output includes a ripple component. This is because any ripple present is in synchronism with the sync waveform, and correspondingly with the multivibrator operation.

A voltage divider formed by resistors 108 and 110 in the timing adjust unit 62 is connected across the output signal from differential amplifier 48 to apply a portion of this signal to the base of a common emitter transistor 112.

Accordingly, the conduction of transistor 112 varies in accordance with the magnitude of the differential amplifier 48 output signal, and its conduction in turn controls the conduction of transistor 114. The series combination of the emitter-collector path of this transistor and resistors 116 and 118 is in parallel with a resistor 120, and the current through this parallel combination charges a capacitor 122 connected to control the duration of the astable period of the monostable multivibrator 42. That is, capacitor 122 and charging resistor 120 are the basic timing elements of the multivibrator. The adjustable shunting of the charging resistor 120 by transistor 114 provides an adjustable decrease in the astable period of the multivibrator. It is in this manner that the timing adjust unit controls the inhibit timing which the multivibrator 42 produces.

With further reference to FIG. 3 and in accordance with the showing in FIG. 1, the pulse train output from the multivibrator 42 is applied to both the inhibit circuit 40 and the reference trigger generator 54, both shown in the lower left portion of FIG. 3. In the inhibit circuit 40, a current-limiting resistor 124 and an isolating diode 126 apply the multivibrator output pulses to the base of an amplifying transistor 128 which controls the conduction of a transistor 130.

The collector of the latter transistor, which is the output lead from the inhibit circuit, is direct-coupled to the base of an input transistor 132 of the trigger generator 36. Note that a resistor 134, connected at one end to the DC supply voltage of the trigger generator 36, is connected at the other end to a grounded resistor 136 and through a larger resistor 138 to the emitter of transistor 132. This arrangement of resistors 134, 136, and 138 maintains the transistor 132 emitter at a significant positive potential relative to the base when transistor 130 is conducting. This bias arrangement ensures that transistor 132 does not respond to the speed error signal applied to its base, when the transistor is otherwise maintained nonconducting by the inhibit circuit 40. That is, the low, inhibit level of voltage output from the multivibrator 42 when the astable state causes transistor 128 to be non-conducting, which in turn causes transistor 130 to be on. The resultant collector-emitter conduction therein clamps the base of transistor 132 to a lower potential than the resistors 134, 136 and 138 maintain at the emitter of this transistor. Consequently, transistor 132 is nonconductive in this condition of the multivibrator voltage.

Conversely, when the monostable multivibrator 42 voltage rises to the higher value shown in FIG. 2E, transistor 128 conducts, causing transistor 130 to become nonconductive. The conduction of transistor 132 is then responsive to the speed-compare error signal applied to its base.

The resultant conduction in transistor 132 turns on a further transistor 140 in the trigger generator 36 to charge a capacitor 142 which is connected with a unijunction transistor 144 in a conventional firing circuit. Note however that unijunction transistor 144 draws its operating power from the sync signal. As shown in FIG. 2C, this signal has a positive voltage level except during the zero crossing of the AC line voltage, and hence the unijunction transistor 144 cannot fire during these times when the AC line voltage is zero.

The trigger signal from the unijunction transistor 144, which is the output signal of the trigger generator 36, is applied in the motor control unit 38 to the primary winding of a pulse transformer 146. This transformer has two secondary windings 146a and 146b, each of which is connected through a protective series resistor 148, 150, respectively, to the gate of a controlled rectifier 152, 154, respectively. These rectifiers are arranged with diode rectifiers 156, 158, in a bridge configuration, as shown.

The motor 10, illustrated as a series universal motor, has its field winding 10a connected in series with its armature winding 10b across the output terminals of the controlled-rectifier bridge. The AC line voltage is applied to the input bridge terminals, as shown.

In the reference trigger generator 54, a current-limiting resistor 160 in series with an isolating diode 162 applies the multivibrator 42 output pulses to the base of a common-emitter transistor 164 to control its conduction in a manner similar to the control of the inhibit circuit transistor 128. A resistor 166 is connected between a positive DC supply voltage and the interconnection of resistors 168 and 170, which are in series with the emitter of transistor 164 and ground. These resistors ensure that the transistor 164 is nonconductive during the inhibit times, in the same manner as the conduction of transistor 132 in the trigger generator 36 is inhibited.

The collector of transistor 164 is direct coupled to the base of a charging transistor 172, to charge a capacitor 174 connected in a firing or trigger-generating circuit with a unijunction transistor 176.

A pulse transformer 180 couples the trigger pulses from the unijunction transistor 176, which is powered by the sync voltage as discussed above with reference to the trigger generator 36, to the control gate of a triac 182 in the reference load control unit 56. The triac 182 is in series with the resistive reference load 52 and the secondary winding of a power transformer 186, the primary of which is connected across the same AC line voltage as is applied to the controlled rectifier bridge in the motor control unit 38.

With this construction of the reference trigger generator 54 and the reference control unit 56, upon termination of each inhibit time of the multivibrator 42, the unijunction transistor 176 gates the triac 182 into conduction for the remainder of the AC line voltage half cycle, so that the resistive reference load 52 receives a gated portion of the line voltage, as indicated in FIG. 2G.

FIG. 3 illustrates the feedback sensor 58 as a coupling transformer having the primary winding connected in parallel with the resistive reference load 52, and the secondary winding connected to the terminals a—a of the feedback control unit rectifier bridge 94.

The operation of the control system of FIG. 1 when constructed in the manner detailed in FIG. 3 can be stated as follows. When the motor 10 is at rest and the speed control 16 is then set to a selected speed, the resultant speed error signal from the differential amplifier 20 tends to apply full drive voltage to the motor. However, the motor will not receive this voltage due to the limiting function which the second control loop provides.

In particular, the limit error signal at this time from differential amplifier 48 has a value determined primarily by the offset potentiometer 96 in the feedback control unit 60. In response to this offset-responsive error signal, the timing adjust unit 62, multivibrator 42 and inhibit circuit 40 impose a maximum inhibit on the trigger generator 36. Consequently, the trigger generator 36 is inhibited during the major portion of each half cycle of the AC line power so that it gates and rectifies only a small, e.g. 30°, portion of the line voltage (FIG. 2A) in each half cycle, i.e. out of each 180°, to the motor 10.

FIG. 4, which shows a graph of the maximum or limited value of drive voltage available to the motor as a function of speed, represents this initial starting condition at point 190. The offset level is set, by way of potentiometer 96, so that the resultant motor torque is below the desired maximum value.

Note that the elements 62, 42 and 40 together convert the direct current limit error signal from differential amplifier 48 to an inhibit gating signal, applied to the trigger generator 36, with a duration proportional to the error signal magnitude. Hence these three elements together form an inhibit gate 188, as indicated in FIG. 1. Note also that the reference trigger generator 54, reference load control 56, reference load 52, feedback sensor 58 and the bridge rectifier 94 of the feedback control unit 60 together function to convert the inhibit-controlling pulse train from multivibrator 42 to a correspondingly proportional DC voltage level.

As the motor speed increases, the speed-responsive input signal to the limit compare differential amplifier 48, by way of the delay integrator 46, increases. To portially offset this increasing speed-responsive signal, the second control loop calls for a larger feedback reference signal to the other input of the amplifier 48. This in turn requires a shorter inhibit time from the inhibit gate 188, FIG. 1. The resultant gating of more AC power to the reference load 52 through the triac 182 and the reference trigger generator 54 provides the requisite increased reference feedback signal. Correspondingly, the decreased inhibit gating time enables the trigger generator 36 to raise the limit it imposes on the drive voltage to the motor.

This operation, where the limited motor drive voltage increases with motor speed, is shown in FIG. 4 with the linearly increasing portion 192 of the curve. The slope of this curve portion, which corresponds to the rate of increase in the limited available drive voltage with motor speed, is set by means of the rate potentiometer 100 in the feedback control unit 60. Adjustment of this potentiometer varies the portion of the reference feedback voltage (developed across rectifier bridge 94) which is applied to the limit compare differential amplifier 48.

It has been found that the drive system of FIG. 1 operates during this period of linearly increasing limited voltage with motor speed, i.e., the operation plotted in FIG. 4 with curve portion 192, to apply an essentially constant current to the motor 10. Accordingly, the motor torque, which is closely proportional to motor current, remains essentially constant throughout this operation, as desired.

The operation shown in FIG. 4 with curve portion 192, where the maximum allowable motor drive voltage increases linearly with motor speed at a rate determined by the rate potentiometer 100, continues until the motor speed attains a selected limit value. This limit value of motor speed is set by means of the limit potentiometer 86 in the limit adjust unit 50. (Where the motor speed increases at a rapid rate, as with no load, the delay integrator 46 imposes a further limit on the corresponding rate of limited motor voltage.)

When the motor speed attains the limit value, the limit adjust circuit clamps the voltage output from the delay integrator to impose a limited maximum speed-responsive voltage to differential amplifier 48. Hence, even when the motor speed increases beyond the limit value, the speed-responsive input signal to the differential amplifier 48 does not reflect this higher speed.

In response to the fixed limit value of the speed-responsive signal which it receives, the limit compare differential amplifier 48 drives the inhibit gate 188 to maintain a fixed limit value on the motor drive voltage, as indicated in the FIG. 4 graph with portion 194, as motor speed continues to increase. In response to this fixed, limit value of drive voltage, the motor input current, and correspondingly the motor torque, decrease with increasing speed beyond the limit value.

Another operational feature of the motor drive system described above is that in the event of an overload on the motor, it automatically brings the limited available motor voltage down to the offset value, unless the overload condition abates. That is, when the motor is operating with the limit value of drive voltage, i.e. along the portion 194 of the FIG. 4 curve, the introduction of an excessive load on the motor due to a fault or otherwise will cause the motor speed to decrease. When the motor speed decreases to the limit value, the drive system begins to decrease the limited value of motor drive voltage. This causes further speed reduction, and thus moves the operating condition progressively down along the linear portion 192 of the FIG. 4 operating curve. This progressive decrease in limited motor drive voltage with decreasing speed, continues until the motor speed decreases to zero. The operation is then at point 190 on the FIG. 4 curve, and the drive system limits the motor drive voltage to the offset value, which is set to be a safe value even when the motor is stalled. That is, the offset value of limited motor voltage is selected so that it will not damage the motor even when stalled.

Because of the essentially zero delay of the speed-responsive signal through the delay integrator 46 for decreasing motor speed, and with the use of the above-described reference feedback voltage (from the reference load 52), the drive system of this invention automatically provides the foregoing response to an overload condition essentially instantaneously so that at least most overload conditions do not damage the motor or the motor load.

In the event of a failure in any element of the motor drive system of FIG. 1 which produces the speed-responsive signal normally output from the DC tach circuit 34, the drive system again limits the maximum motor drive voltage to the offset value. This precludes a runaway condition, encountered with some prior art motor control systems. The drive system automatically provides this protection in the event of a speed-signal failure because the failure causes the output signal from the DC tachometer circuit 34 to drop to the zero speed level. As FIG. 4 indicates, when the speed compare differential amplifier 20 receives a zero speed signal, the drive system limits the motor drive voltage to the offset value, i.e. limits the motor to operate at point 190 on the FIG. 4 characteristic.

With further regard to the speed sensing portion of the FIG. 1 drive system, the invention can be practiced with other known constructions, such as a tachometer generator driven by the motor, for producing a signal responsive to the motor speed. For this variation, the tachometer generator would replace the lamp 30, chopping disc 26, optical sensor 28 and multivibrator 32. This and similar variations in the system of FIG. 1 can be implemented with conventional skills known in the art. However, the particular form of speed sensor illustrated in FIG. 1 is considered preferable for many applications because of its ability to discern a zero motor speed from a small but non-zero value.

Although the invention is described above with particular reference to driving a motor shaft of limited torque capacity, the invention also is not limited in this respect. Quite the contrary, the invention advantageously finds application in a variety of motor driving applications, including those where the motor drives a gear mechanism of limited torque capacity or drives any other form of load having limited torque characteristics. Thus, the particular nature of the motor load does not form a part of the invention, but rather serves to illustrate advantages and features of the inventive drive system.

Where the drive system of FIG. 1 is to be used to drive a shunt motor, rather than the series motor 10 illustrated in FIG. 3, only the armature of the shunt motor is connected across the controlled rectifier bridge 38, FIG. 3. The field winding of the motor is excited separately, as is conventional with shunt motor drives.

It will thus be seen that the objects set forth above, among those made apparent from the preceding description, are efficiently attained. Since certain changes may be made in the above construction, without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. In proportional speed controlling, electric motor-driving apparatus which produces a speed control signal and responds thereto normally to apply electrical power to a motor for a portion of each of a succession of periodic times, the improvement comprising
- A. means for producing a first signal responsive to the speed of the motor,
- B. means for producing a reference signal proportional to a selected maximum electrical voltage available for application to such motor at the instantaneous speed of the motor,
- C. reference feedback means connected to said reference producing means for producing a second signal responsive to said reference signal,
- D. compare means for producing a third signal responsive to a comparison of said first signal with said second signal, and
- E. gating means for producing an inhibit signal having in each of said periodic times an inhibit interval responsive in duration to said third signal, and for disabling said response to said speed control signal for said inhibit interval in each said periodic time.

2. In speed controlling apparatus as defined in claim 1, the further improvement in which said reference feedback means includes means for producing said second signal to identify a limited maximum starting voltage available to the motor and to identify a limited acceleration voltage available to the motor.

3. In speed controlling apparatus as defined in claim 1, the further improvement comprising offset means in said reference feedback means for applying a selected offset component to said second signal.

4. In speed controlling apparatus as defined in claim 1 the further improvement comprising rate means in said reference feedback means for producing said second signal in response to a selected portion of said maximum electrical voltage available for application to said motor.

5. In speed controlling apparatus as defined in claim 1, the further improvement comprising delay means in circuit with said first signal-producing means and responding to a rising-speed condition of said first signal to introduce a time delay between the value of the actual speed of the motor and the speed-responsive value of said first signal.

6. In speed controlling apparatus as defined in claim 1, the further improvement comprising limit means in circuit with said first signal-producing means for limiting the maximum value of said first signal.

7. In phase-controlled electric motor drive apparatus having a motor-driving circuit for selectively gating rectified periodically-alternating voltage to the motor in response to the actual motor speed relative to a selected motor speed, the improvement comprising
- A. a reference load resistor,
- B. reference drive means for applying to said load resistor phase-controlled electrical voltage in synchronism with said rectified alternating voltage,
- C. adjustable timing means connected with said motor driving circuit for limiting the maximum phase duration of said gated voltage applied to the motor and connected with said reference drive means for actuating said reference drive means to apply said phase controlled voltage to said reference resistor for said maximum phase duration, and
- D. feedback controlling means for adjusting said maximum phase duration of said timing means in response to a comparison of a reference signal identifying the electrical power said drive means applies to said reference resistor and a speed signal identifying said actual motor speed.

8. In drive apparatus as defined in claim 7, the further improvement in which said feedback controlling means increases said maximum phase duration with increasing motor speed, and includes acceleration-limiting means for limiting the rate at which it increases said maximum phase duration with increasing motor speed.

9. In drive apparatus as defined in claim 8, the further improvement comprising means for limiting the value of said maximum phase duration independent of actual motor speed in excess of a selected value.

10. In drive apparatus as defined in claim 7, the further improvement in which said acceleration-limiting means includes
- A. rate means connected with said feedback controlling means for selectively proportioning said reference signal to adjust the portion of said reference load power compared with said motor speed signal, and
- B. delay means connected with said feedback controlling means and introducing a selected delay in said speed signal relative to the actual motor speed.

11. Electrical drive apparatus for connection to an electrical motor and comprising
- A. an adjustable trigger generator for the phase-controlled gating of rectified alternating supply voltage to such motor in response to a difference function between a speed signal identifying and responsive to the motor speed and a further signal identifying a selected motor speed,
- B. gating means connected with said trigger generator, synchronized with said alternating supply voltage, and responsive to a limit error signal to produce an inhibit signal for enabling said trigger generator to gate said supply voltage to such motor only after an inhibit time in each half cycle of said alternating voltage,
- C. reference means synchronized with said alternating supply voltage and connected with said gating means for producing a reference signal responsive to the magnitude of the maximum limit of alternating supply voltage said gating means enables said trigger generator to apply to such motor, and
- D. feedback means producing said limit error signal in response to an arithmetic difference function of said reference signal relative to said speed signal.

12. Motor driving apparatus as defined in claim 11
- A. in which said alternating supply voltage has a periodic waveform, and
- B. further comprising synchronizing means in circuit with said alternating supply voltage and applying to each of said gating means, said reference means, and said trigger generator a synchronizing signal having a pulse coincident with each zero-voltage crossing of said supply voltage.

13. Motor driving apparatus as defined in claim 11 in which said reference means further comprises
- A. a reference resistor,
- B. a reference trigger generator responsive to said inhibit signal for gating said alternating supply voltage to said reference resistor upon termination of each inhibit time, and C. sensor means coupled with said reference resistor for producing said reference signal in response to the voltage said reference trigger generator applies to said reference resistor.

14. Motor driving apparatus as defined in claim 11
A. in which said supply voltage has a periodic waveform, and
B. in which said gating means produces said inhibit signal in each half cycle of said supply voltage commencing with each zero-crossing thereof and with a duration less than half the period thereof, thereby to limit the maximum voltage said adjustable trigger generator applies to such motor.

15. Motor driving apparatus as defined in claim 11 in which said feedback means includes
A. differential amplifier means producing said limit error signal and having two inputs, one of which receives said reference signal, and
B. delay integrator means receiving said speed signal and applying it to the other input of said differential amplifier with a first delay when said speed signal identifies an increasing motor speed, and otherwise with lesser delay.

16. Motor driving apparatus as defined in claim 15 in which feedback means includes limit-clamping means connected with said other input of said differential amplifier and for limiting the value of the speed-responsive signal applied thereto.

17. Motor driving apparatus as defined in claim 11 in which said feedback means includes an offset generator for superposing said reference signal on a selected offset signal.

18. Motor driving apparatus as defined in claim 11 further comprising proportional controller means producing said speed signal with a zero-speed value in the absence of a non-zero motor speed.

* * * * *

UNITED STATES PATENT AND TRADEMARK OFFICE
CERTIFICATE OF CORRECTION

PATENT NO. : 3,845,371
DATED : October 29, 1974
INVENTOR(S) : Peter S. Grinnell, Jr.

It is certified that error appears in the above-identified patent and that said Letters Patent are hereby corrected as shown below:

Column 1, line 30, change "reaction" to --reactive--.

Column 6, line 63, after "when" insert --in--.

Column 8, line 50, change "portially" to --partially--.

Column 12, line 15, after "claim", change "7" to --8--.

Signed and Sealed this second Day of December 1975

[SEAL]

Attest:

RUTH C. MASON
*Attesting Officer*

C. MARSHALL DANN
*Commissioner of Patents and Trademarks*